United States Patent [19]

Ishii

[11] Patent Number: 5,241,526
[45] Date of Patent: Aug. 31, 1993

[54] RECORDING DATA PRODUCING SYSTEM FOR OPTICAL RECORDING

[75] Inventor: Toshiyuki Ishii, Kanagawa, Japan

[73] Assignee: Sony Corporation, Tokyo, Japan

[21] Appl. No.: 808,211

[22] Filed: Dec. 16, 1991

[30] Foreign Application Priority Data

Dec. 27, 1990 [JP] Japan ................................ 2-414667

[51] Int. Cl.$^5$ .............................................. G11B 7/00
[52] U.S. Cl. ...................................... 369/124; 369/100
[58] Field of Search ................ 369/124, 100, 54, 83, 369/84; 360/15, 14.1, 31

[56] References Cited

U.S. PATENT DOCUMENTS 4,727,509  2/1988  Johnson et al. ...................... 360/15
4,794,465  12/1988  Van Luyt et al. ................. 360/10.1

Primary Examiner—Jack I. Berman
Attorney, Agent, or Firm—Philip M. Shaw, Jr.

[57] ABSTRACT

A recording data formulating system employed in a pre-mastering process in the course of preparation of a pre-recorded optical disc is disclosed, in which the audio information and the video information are converted by a computer 11 into the information conforming to the CD-I data format, and in which the amount of the converted software corresponding to at least the capacity of an optical disc is stored in the memory 13. Data reproduction is made by the CD-I player 15 based on the data read out from memory 13.

4 Claims, 3 Drawing Sheets

RECORDING DATA PRODUCING SYSTEM FOR OPTICAL RECORDING

BACKGROUND OF THE INVENTION

There is currently proposed a system, known as a CD-I system, in which video data, such as natural picture, RGB graphics, color lookup table graphics or animation, computer data, or application programs, abbreviated hereinafter to programs, are recorded on a compact disc, in addition to audio data, and in which a user may use these data interactively. Inasmuch as this CD-I system has the functions of reproducing the voice, letters or pictures, and executing program(s), and may be used in connection with AV devices for mainly audio and video information and electronic publication mainly of letter or character information, as well as educational or amusement devices, which rely upon program execution, it is thought to be a promising new type media system.

The CD-I system is made up of an optical disc on which audio data, video data or the like are recorded, referred to hereinafter as a CD-I disc, and a player for reproducing a CD-I disc, referred to hereinafter as a CD-I player. Various specifications have been prescribed in connection with the CD-I system with a view to maintenance of interchangeability and extensive propagation for domestic use.

In a CD-I disc, a plurality of recording formats are provided as a function of the variable degrees of data reliability. For example, audio and video data, for which especially high data reliability is not a particular requirement, are recorded in accordance with a so-called form 2 of the CD-I data format, whilst computer data or programs, which are in need of high data reliability, are recorded in accordance with a so-called form 1 of the CD-I data format, in which error detection and correction may be made during data reproduction.

With the CD-I system, the audio data may be recorded and/or reproduced at four sound quality levels, so that the audio data are processed with four-level data compression or coding, depending on the desired sound quality level, before being recorded on the CD-I disc. Thus the recorded data may be 16-bit PCM (Pulse Code Modulation) audio data for a conventional compact disc, referred to hereinafter as PCM audio data, or 8- or 4-bit ADPCM (Adaptive Differential Pulse Code Modulation) audio data, or so-called A-level, B-level or C-level audio data, referred to hereinafter as ADPCM audio data.

On the other hand, four picture quality levels, namely the picture quality for natural pictures, e.g. color photographs, that for RGB graphics, that for color lookup table graphics (CLUT graphics) and that for animation, may be used for video data with the CD-I system, so that the video data are processed with data compression or encoding in accordance with the desired picture quality before being recorded on the CD-I disc. That is, with the picture quality for natural picture, the video data are encoded with 8 bits per pixel and processed with non-interlaced DYUV encoding for recording. With the picture quality for RGB graphics, three color signals (RGB signals) for each pixel are encoded with 5 bits for recording and, with the picture quality for CLUT graphics, the video data are recorded so that 256 colors may be displayed simultaneously by allocating 8 bits for each pixel. Finally, with the picture quality for animation, the video data for the CLUT graphics are processed with data compression by the so-called run-length coding for recording.

Meanwhile, a 68000 series microcomputer, which is a 16-bit CPU developed by MOTOROLLA Inc. is preferentially employed as a microcomputer controlling the operation of a CD-I player, while a so-called compact disc real-time operating system (CD-RTOS), corresponding to the existing OS-9, an operating system developed by MICROWEAR Inc. but added to by input/output managers and drivers for graphics/visual, pointer and audio processing operations, is preferentially employed as an operating system (OS), in consideration of program interchangeability and execution efficiency on the CD-I disc. In addition, an X-Y device, which may be accessed on the pixel-by-pixel basis, and a trigger button (for execute/stop), are preferentially employed as input devices. Besides, a compact disc (CD), on which only music has been recorded, may also be reproduced with the CD-I system.

The CD-I disc, employed in the CD-I system, for which the above mentioned specifications have been prescribed, is a reproduce-only disc, and represents an inexpensive large-capacity memory. The CD-I disc may be produced by reproducing a large number of replicas from a single master metal mold (master stamper).

The process of preparing a reproduce-only optical disc is explained briefly hereinbelow.

The process for preparing an optical disc is roughly divided into two sub-processes, namely the mastering sub-process and the replication sub-process. The mastering sub-process means a sub-process until completion of the metal mold (stamper) necessary for replication of a pre-record on a resin substrate, while the replication sub-process means a sub-process until completion of the disc by using the stamper.

The mastering sub-process is initiated with applying a photoresist, a photosensitive material, on a ground substrate, such as a glass substrate, for producing a sensitized film, which is then exposed to a laser beam for recording the information thereon, by way of performing so-called cutting. After the end of cutting, development and electroforming are performed, in this order, for transferring the information to the metal surface of a metal master. Using this metal master, a number of stampers necessary for replication of the optical discs are produced.

At the replication step, discs are replicated using the above stampers. The information recorded on the stamper is transferred by resin molding onto the surface of a resin substrate. A reflective or recording film is then formed on the substrate and the resulting assembly is machined to an ultimate disc.

The information (software) to be recorded on the disc during the mastering sub-process needs to be formulated and prepared in advance. This process of the preparation of the software is termed a premastering step.

The software producing or formulating system for a conventional optical disc, employed in the pre-mastering step, is hereinafter explained.

A CD-I recording/reproducing system is described for example in U.S. Pat. No. 4,794,465, in which it is stated that, in the CD-I recording/reproducing system, an information stream comprising data, audio and video frames is supplied to a signal combination unit and applied to a write unit to make a final compact disc (CD). Therefore, with this system, the quality of the degree of completion of editing of the information to be recorded on the disc, such as computer software data or audio or video information, can not be checked until the completed disc is reproduced by the CD-I recorder.

There has been developed a system in which the information is once recorded on a write-once read-many type disc before preparation of the complete disc, and the information recorded on the write-once read-many type disc is reproduced by the CD-I player. With this system, in which the information is recorded on and tentatively reproduced from the write-once read-many type disc, before ultimately recording the information on the compact disc, information processing, editing or retouching may be performed at reduced costs as compared to the case in which the same operations are performed on the ultimate compact discs. FIG. 1 shows the system for software formulation using the write-once read-many type disc, above all, the verification system for the information to be recorded on the optical disc.

Referring to FIG. 1, this software formulating system is indicated by a reference numeral 50, and includes a computer 51, a large-capacity hard disc 52 for recording the source information, that is, music, picture or program information, a software for converting the source information into information of a prescribed recording format, a write-once optical disc writer 54 to which the software recorded on the hard disc 52 is transferred and which is adapted for writing the software on a write-once read-many type optical disc 53, and a CD-I player 55 for actually driving the disc 53.

It is noted that the information can be recorded only once on the disc 53.

The source information recorded on the hard disc 52, that is the audio or video data or the program(s), are converted by the computer 51, based on the conversion software, similarly recorded on the hard disc 52, into information conforming to the CD-I data format.

Specifically, the audio data are processed by the computer 51 with A-level, B-level or C-level ADPCM depending on the required sound quality. The video data are also processed depending on the required picture quality, such that the natural picture quality video data are processed by non-interlaced DYUV encoding and the animation quality video data are processed by run-length encoding. Meanwhile, the CD-DA (Digital Audio) level audio data, that is the audio data recorded on the conventional compact disc, RGB graphics video data or the CLUT graphics video data, are not processed by the computer 51 with data compression.

The audio and video data, computer data and program(s), processed in this manner, are further processed by the computer 51 with encoding by CIRC (Cross Interleave Reed-Solomon Code) for error detection and correction at the time of reproduction, and with EFM (Eight-to-Fourteen Modulation) for forming signals to be actually recorded on the optical disc.

That is, the audio or video data are first converted by the computer 51 into data conforming to the form 2 of the CD-I data format. This conversion is performed in such a manner that, as shown in FIG. 2, a sub-code is arranged in a 98-byte area 61 from the leading end of a data block, followed by a sync pattern, a header and a sub-header, which are arranged in succeeding 12-byte, 4-byte and 8-byte areas, respectively. Audio or video data are arranged in a succeeding 2324-byte user area 65 and an error detection code (EDC) is arranged in the trailing 4-byte area 66. On the other hand, the computer data or program(s), which are in need of high data reliability, are converted by the computer 51 into data or program(s) conforming to the form 1 of the CD-I data format. This conversion is performed in such a manner that, as shown in FIG. 3, a sub-code is arranged in a 98-byte area 61 from the leading end of a data block, followed by a sync pattern, a header and a sub-header, which are arranged in succeeding 12-byte, 4-byte and 8-byte areas, respectively. Computer data or program(s) are arranged in a succeeding 2324-byte user area 65 and an error detection code (EDC) and an error correction code are arranged in the next succeeding 4-byte area 76 and 276-byte area 77, respectively.

By the above described signal processing operations, the audio data, video data and the computer program(s) of, for example, about 640 Mbytes, corresponding to a storage capacity of a CD-I disc, may be converted into data conforming to the CD-I data format.

The data formatted according to the CD-I specifications are processed by EFM for recording on the optical disc, and then transferred to the write-once read-many optical disc writer 54 so as to be recorded on the disc 53. After the end of data recording, the disc 53 is loaded on the CD-I player 55 for reproducing the music or the picture for pre-checking the state of the information prior to ultimate recording on the CD-I disc.

During reproduction of the write-once read-many disc, it is checked if the computer software or the like information, recorded on the write-once read-many disc 53, may be reproduced normally. If any problem is raised in connection with the software, the operating steps including the conversion into the CD-I data format and recording on the write-once read-many disc 53 is repeated until the normal software operation is achieved.

With the above described software formulating system, should any problem be raised with the software to be recorded on the optical disc, it is necessary to write the software on a new write-once read-many disc 53 and subsequently reproduce the recorded data thereon by means of a CD-I player by a time-consuming operation with an extremely low operational efficiency.

OBJECT AND SUMMARY OF THE INVENTION

It is therefore an object of the present invention to provide a system for efficiently formulating the information to be ultimately recorded on an optical disc which may be used with the CD-I system.

In accordance with the present invention, there is provided a recording data producing system for a pre-mastering step of a process for preparing a pre-recorded optical disc, comprising data converting means for converting the information, such as audio, video or software information, into the information conforming to the recording format for an optical disc, memory means for storing an output from said data converting means, and optical disc reproducing means electrically connected to said memory means and adapted for reading out and reproducing the information stored in said memory means.

According to the present invention, verification of the information ultimately recorded on the optical disc may be achieved without the necessity of directly recording data on the compact disc (CD) or transiently recording the data on the write-once read-many disc.

DETAILED DESCRIPTION OF THE INVENTION

Figure 1:
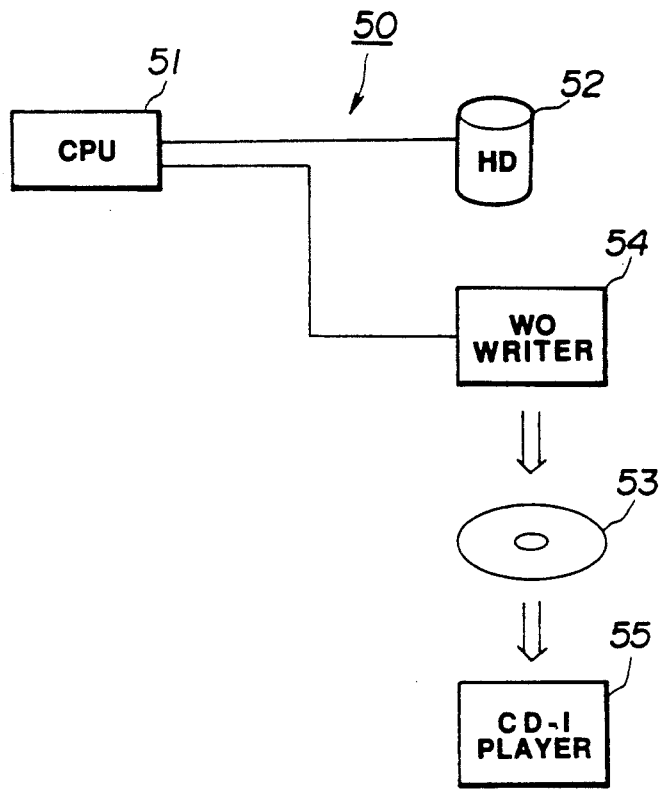
FIG. 1 is a block diagram showing an existing system for formulating recorded data.

Referring to the drawings, a system 10 for formulating the recording information on an optical disc according to the present invention is explained in detail.

Figure 4:
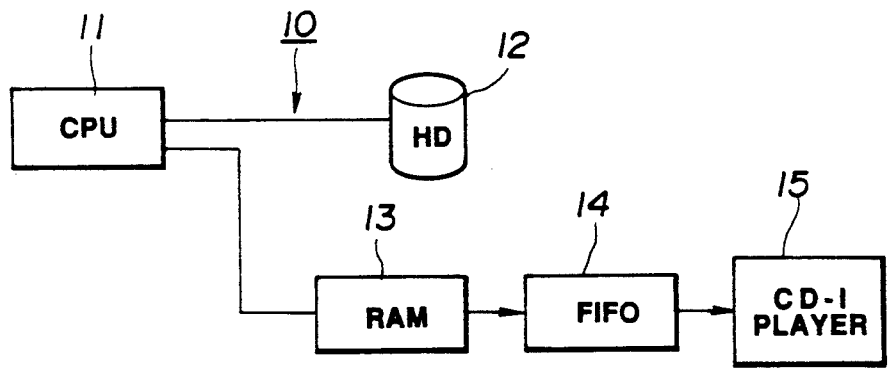
FIG. 4 is a block circuit diagram showing the construction of the present invention.

Referring to FIG. 4, the system 10 includes a computer 11, a large-capacity hard disc 12 for recording the source information, that is, music, picture or program information, and a software for converting the source information into the information conforming to a prescribed recording format, a RAM 13 to which the data recorded on the hard disc 12 are transferred for storage therein, a FIFO (First In First Out Memory) 14 for adjusting the transfer rate of data read out from the RAM 13 in the sequence in which they are reproduced, and a CD-I player 15 for reproducing data outputted from FIFO 14.

The RAM 13 preferably has a storage capacity equal to that of a CD-I disc, that is, a storage capacity of, for example, about 640 Mbytes. The data transferred from the hard disc 12 are adapted to be stored in the RAM 13.

Meanwhile, the CD-I player 15 is not provided with a disc driving unit, optical pickup or a data reproducing circuit for reproducing data from the playback RF signals, but is provided with an EFM demodulator and components downstream thereof, such as an error detection and correction circuits, audio signal reproducing circuits, video signal reproducing circuits and a 68000 series CDU for executing the application program(s).

Figure 5:
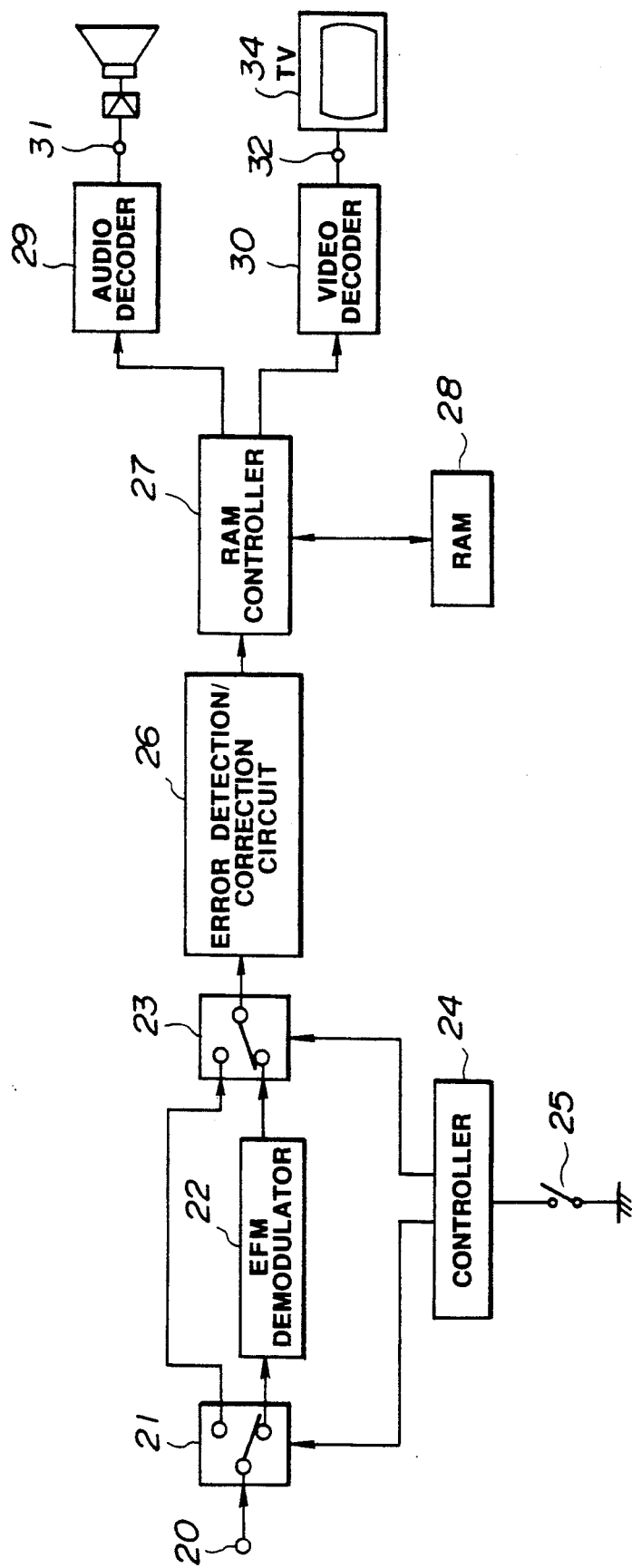
FIG. 5 is a block circuit diagram showing a CD-I player to which the present invention is applied.

FIG. 5 shows a typical construction of the CD-I player 15. Output data from the FIFO 14 are supplied to an input terminal 20 of the CD-I player. If the output data from FIFO 14 are EFM modulated data, they are supplied to the EFM demodulator 22 by means of a switch 21 for demodulation. If the output from the FIFO 14 are not the EFM modulated data, they are transmitted by means of switches 21, 23 to an error detection/correction circuit 26. The switching states of the switch 25 is determined depending on whether or not the data supplied at input terminal 20 are the EFM modulated data. A control signal for simultaneously changing the switching states of the switch 21 and 23 responsive to the operation of the switch 25 is supplied by a controller 24. Data demodulated by an EFM demodulator 22 are supplied by means of switch 23 to the error detection/correction circuit 26 for detecting and correcting possible errors in the transmitted data. Parity data for error detection and correction are generated and appended to the transmitted data at the time of conversion in the hard disc 12 into data of the predetermined recording format. Output data from the error detection/correction data are transiently stored in RAM 28 by means of a RAM controller 27. Data stored in RAM 28 are read out under address control by RAM controller 27 so as to be transmitted to an audio decoder 29 or to a video decoder 30. The audio decoder 29 is provided with a D/A converter, not shown, so that input audio data are thereby decoded and analog audio signals are transmitted by means of the D/A converter to an output terminal 31. If need be, the bit-reduced input data are restored to original data for conversion into analog audio signals by means of the D/A converter. The video decoder 30 decodes the input video data and appends predetermined sync signals thereto before outputting the data at video output terminal 32. A video monitor 34 may be connected to terminal 32 for monitoring video signals decoded by the video decoder 30.

Referring to FIG. 4, the operation of the present system for formulating the recording information on the optical disc is explained.

The source information recorded on the hard disc 12, namely the audio data, video data, computer data or application program(s), are converted by the computer 11, based on the conversion software for conversion into predetermined format data, similarly stored in the hard disc 12, into the information conforming to the CD-I data format.

Specifically, the audio data are processed by computer 11 with adaptive differential PCM (ADPCM) in accordance with the required sound quality levels. The video data are processed with predetermined picture processing in accordance with the required picture quality level. The natural picture quality video data are processed with a non-interlaced DYUV encoding, while the animation quality video data are processed with run-length encoding. It is noted that the CD-DA level audio data, that is audio data recorded on a conventional compact disc, video data od RGB graphics and video data of CLUT graphics, are not processed with data compression by the computer 11.

The audio and video data, computer data and program(s), obtained in the manner described above, are processed by the computer 11 with CIRC (Cross Interleave Reed Solomon Code) and subsequently with EFM (Eight-to-Fourteen Modulation).

Figure 2:
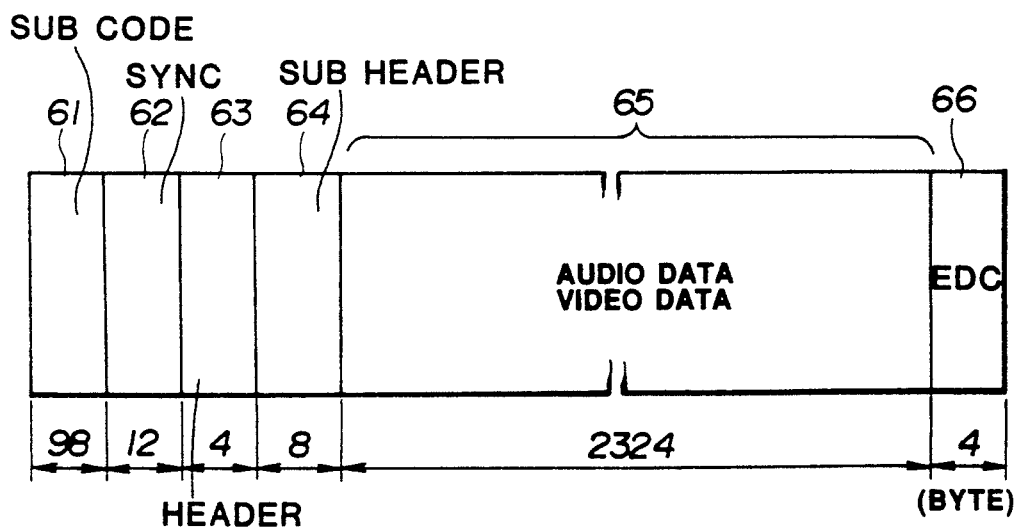
FIG. 2 shows a data format of the form 2 of the CD-I format.
Figure 3:
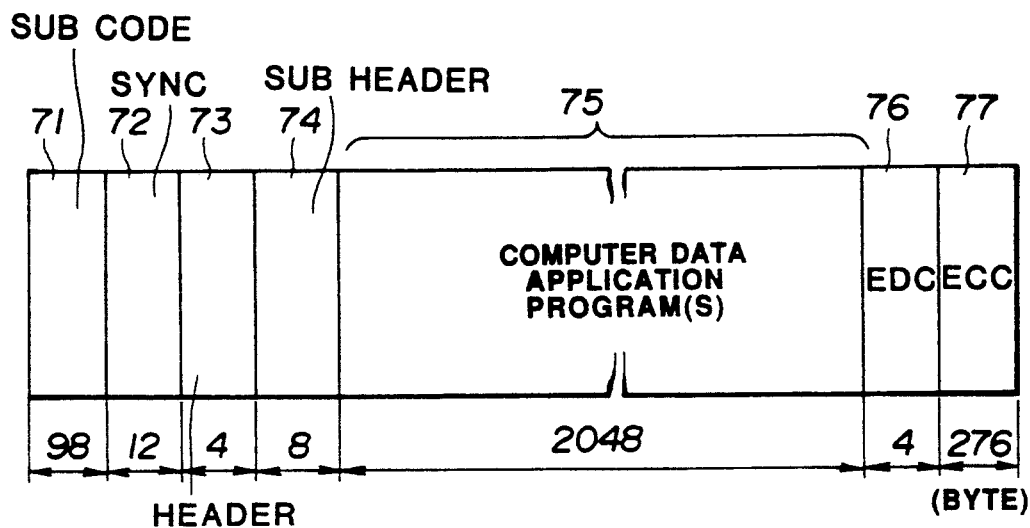
FIG. 3 shows a data format of the form 1 of the CD-I format.

That is, the EFM modulated audio or video data are converted by the computer 11 into data conforming to the form 2 of the CD-I data format shown in FIG. 2. This conversion is performed in such a manner that, as already explained in connection with the prior art, a 98-byte sub-code is arranged in a leading area of a data block, followed by a 12-byte sync pattern, an 4-byte header, an 8-byte sub-header, 2324-byte audio or video data, and a 4-byte error detection code (EDC). On the other hand, the computer data or program(s) are converted by the computer 11 for conforming to the form 1 of the CD-I data format. This conversion is performed in such a manner that, as already explained in connection with the prior art, a 98-byte sub-code is arranged in a leading area of a data block, followed by a 12-byte sync pattern, a 4-byte header, an 8-byte sub-header, 2048-byte computer data or program(s), a 4-byte error detection code (EDC) and 276-byte error correction code.

By the above described operations, the 640 Mbyte audio data, video data and program(s), corresponding to the storage capacity of a CD-I disc, are converted for conformity to the CD-I data format. The data thus converted for conformity to the CD-I data format are recorded on the hard disc 12. Thus the operation so far described corresponds to the conventional system for formulating the recording information on the optical disc.

The data recorded on the hard disc 12 are transferred to the RAM 13 so as to be stored therein transiently. The data are read sequentially in an order in which they are to be reproduced, and supplied to FIFO 14.

The FIFO 14 has the function of adjusting the readout rate from RAM 13 and the input rate to CD-I player 15. FIFO 14 outputs data used for reproduction by the CD-I player 15.

In the CD-I player 15, music or picture reproduction or program execution is carried out on the basis of the data stored in RAM 13 without employing the optically reproduced signals.

During this reproduction or execution, it is checked if the information to be recorded ultimately on the disc is in the normal condition. Should any problem be raised in the formulated information, the operation of converting the above mentioned audio or video data into data conforming to the CD-I format and checking the state of the information by the CD-I player is again executed without involving optical signal reproduction.

The information thus formulated so as to be recorded on the disc is forwarded to the mastering sub-process.

With the present embodiment, as described above, the data converted into data of the CD-I data format need not be written or recorded on a write-once read-many disc, as has been the case with the conventional system of formulating the information to be recorded on the optical disc. In this manner, the time for recording the information on the write-once read-many disc may be eliminated to reduce the evaluation cycle significantly as compared to the conventional system of formulating the recording information on the optical disc.

What is claimed is:

1. A recording data formulating system employed in a premastering process in the course of preparation of a pre-recorded optical disc, comprising
    data format converting means for converting the data format of an input information for conformity to a recording format for the optical disc,
    memory means for transiently storing the format-converted data, and
    a CD-I player for directly reproducing signals from output data from said memory means.

2. A recording data formulating system as claimed in claim 1 wherein said memory means has a storage capacity equal to or exceeding the storage capacity of said optical disc.

3. A recording data formulating system as claimed in claim 1 wherein said data format converting means comprises means for appending code data used for error detection and correction during data reproduction.

4. A recording data formulating system as claimed in claim 1 wherein said data format converting means comprises EFM (Eight-to-Fourteen Modulation) modulation means and wherein said CD-I player comprises EFM demodulation means.

* * * * *